(12) United States Patent
Huang et al.

(10) Patent No.: US 8,179,479 B2
(45) Date of Patent: May 15, 2012

(54) METHOD FOR SEPARATING LUMINANCE AND CHROMINANCE OF COMPOSITE TV ANALOG SIGNAL

(75) Inventors: Ling-Hsiu Huang, Sinshih Township, Tainan County (TW); Shing-Chia Chen, Sinshih Township, Tainan County (TW)

(73) Assignee: Himax Media Solutions, Inc., Tainan County (TW)

( * ) Notice: Subject to any disclaimer, the term of this patent is extended or adjusted under 35 U.S.C. 154(b) by 1010 days.

(21) Appl. No.: 12/155,732

(22) Filed: Jun. 9, 2008

(65) Prior Publication Data

US 2009/0303390 A1  Dec. 10, 2009

(51) Int. Cl.
*H04N 9/78* (2006.01)
(52) U.S. Cl. .......................... 348/665; 348/666; 382/162
(58) Field of Classification Search .......... 348/665–670; 382/162, 164, 167, 172, 218–220, 260–264
See application file for complete search history.

(56) References Cited

U.S. PATENT DOCUMENTS

| | | | | |
|---|---|---|---|---|
| 6,031,581 A | * | 2/2000 | Harrington | 348/630 |
| 6,774,954 B1 | * | 8/2004 | Lee | 348/665 |
| 7,869,650 B2 | * | 1/2011 | Park et al. | 382/167 |
| 2009/0040388 A1 | * | 2/2009 | Hong | 348/665 |
| 2009/0091659 A1 | * | 4/2009 | Tanigawa | 348/624 |

FOREIGN PATENT DOCUMENTS

| | | |
|---|---|---|
| JP | 2007-281954 A | 10/2007 |
| TW | I229556 | 3/2005 |
| TW | 200633549 | 9/2006 |
| TW | 200644649 | 12/2006 |

* cited by examiner

*Primary Examiner* — Annan Shang
(74) *Attorney, Agent, or Firm* — Rabin & Berdo, P.C.

(57) ABSTRACT

A method for separating luminance and chrominance of a composite TV analog signal includes the steps of: measuring first differences between horizontal neighbor pixels, second differences between vertical neighbor pixels and third differences between temporal neighbor pixels encoded in the composite TV analog signal; comparing the first, second and third differences with one another to obtain a minimum difference used as a factor of a weighting function; and filtering the composite TV analog signal simultaneously by a two-dimensional (2D) comb filter and a three-dimensional (3D) comb filter according to the weighting function on the basis of the minimum difference to obtain a luminance signal and a chrominance signal, in which magnitudes of a part of the composite TV analog signal filtered by the 2D comb filter and magnitudes of the other part of the composite TV analog signal filtered by the 3D comb filter are determined by the weighting function.

14 Claims, 5 Drawing Sheets present

METHOD FOR SEPARATING LUMINANCE AND CHROMINANCE OF COMPOSITE TV ANALOG SIGNAL

BACKGROUND

1. Field of Invention

The present invention relates to a method for separating luminance and chrominance. More particularly, the present invention relates to a method for separating a luminance signal and a chrominance signal of a composite TV analog signal.

2. Description of Related Art

In a conventional color TV, the analog TV signal is generally transmitted in the form of a composite signal including luminance (Y) plus chrominance (C). Thus, the process of separating the composite signal into the luminance signal and the chrominance signal is essential, and this process is often carried out by a comb filter. In order to obtain a better filtering result, still image signals are always filtered by a three-dimensional (3D) comb filter, and image signals in which motions exist are always filtered by a two-dimensional (2D) comb filter. However, the composite signal usually includes concurrently the still image signal and the image signal in which the motions exist. Consequently, if the composite signal is filtered only by the 3D comb filter or only by the 2D comb filter, the composite signal cannot be separated or filtered very well.

SUMMARY

In accordance with one embodiment of the present invention, a method for separating luminance and chrominance of a composite TV analog signal is provided. The method includes the steps of: measuring first differences between horizontal neighbor pixels, second differences between vertical neighbor pixels and third differences between temporal neighbor pixels encoded in the composite TV analog signal; comparing the first, second and third differences with one another to obtain a minimum difference used as a factor of a weighting function; and filtering the composite TV analog signal simultaneously by a two-dimensional (2D) comb filter and a three-dimensional (3D) comb filter according to the weighting function on the basis of the minimum difference to obtain a luminance signal and a chrominance signal, in which magnitudes of a part of the composite TV analog signal filtered by the 2D comb filter and magnitudes of the other part of the composite TV analog signal filtered by the 3D comb filter are determined by the weighting function.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

For a composite TV analog signal, it includes a luminance (Y) signal and a chrominance (C) signal and has a number of consecutive images encoded therein. FIG. 1A illustrates a processing pixel and its neighbor pixels of a present image according to one embodiment of the present invention. As shown in FIG. 1A, the present image includes one processing pixel (e.g. YC) and its horizontal and vertical neighbor pixels (e.g. YC1, YC2, YC3, YC4). The processing pixel YC and its horizontal neighbor pixels, YC1 and YC2, have differences (e.g. gray level difference) MT and DT therebetween, respectively. The processing pixel YC and its vertical neighbor pixels, YC3 and YC4, have differences (e.g. gray level difference) UP and DN therebetween, respectively.

Figure 1B:
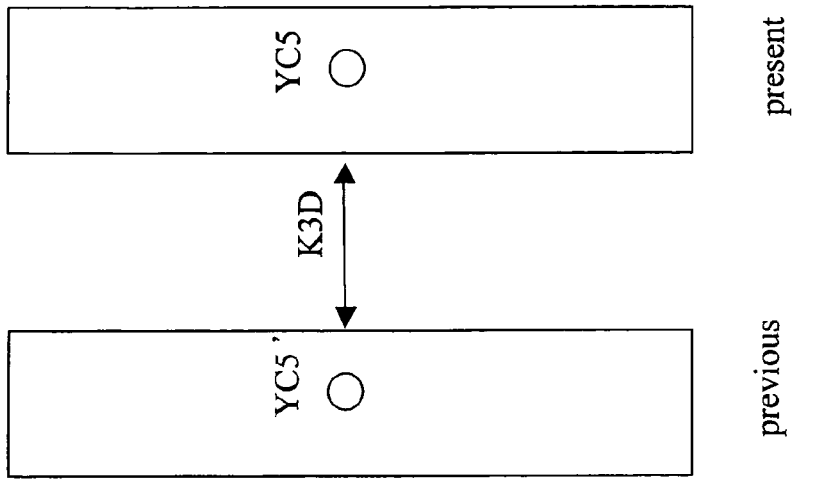
FIG. 1B illustrates a sequence of images having a present processing image and its previous image according to one embodiment of the present invention.
Figure 1A:
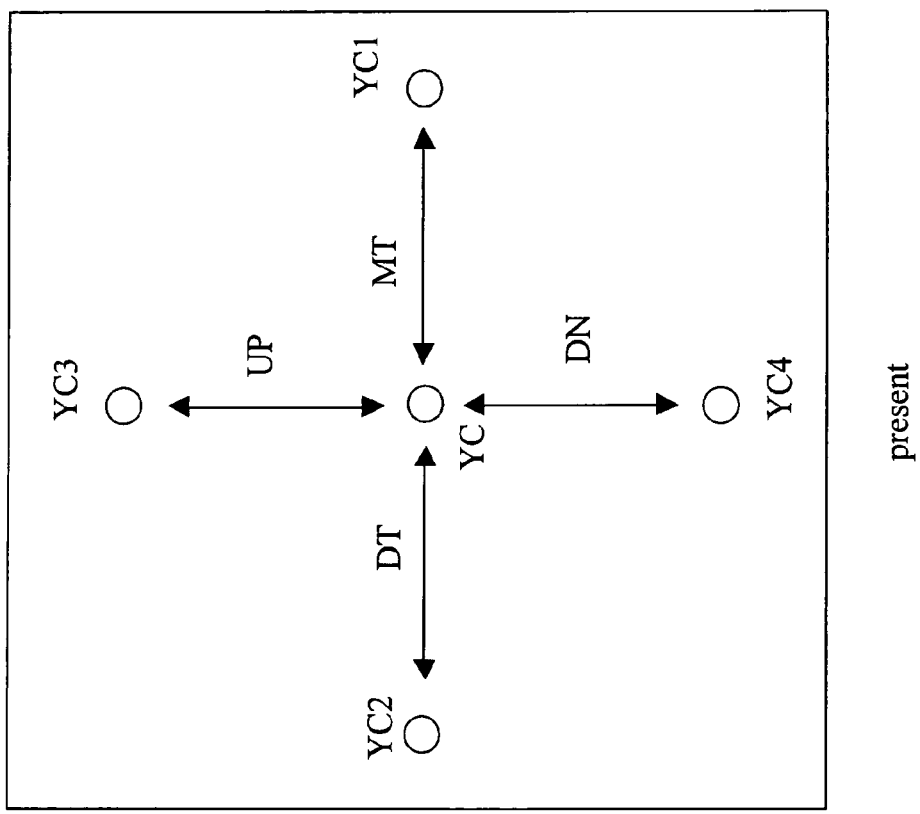
FIG. 1A illustrates a processing pixel and its neighbor pixels of a present image according to one embodiment of the present invention.

FIG. 1B illustrates a sequence of images having a present processing image and its previous image according to one embodiment of the present invention. As shown in FIG. 1B, the present image includes one processing pixel (e.g. YC5), and the previous image includes one temporal neighbor pixel (e.g. YC5'). The processing pixel YC5 of the present image and the temporal neighbor pixel YC5' of the previous image have a difference K3D therebetween.

Figure 2:
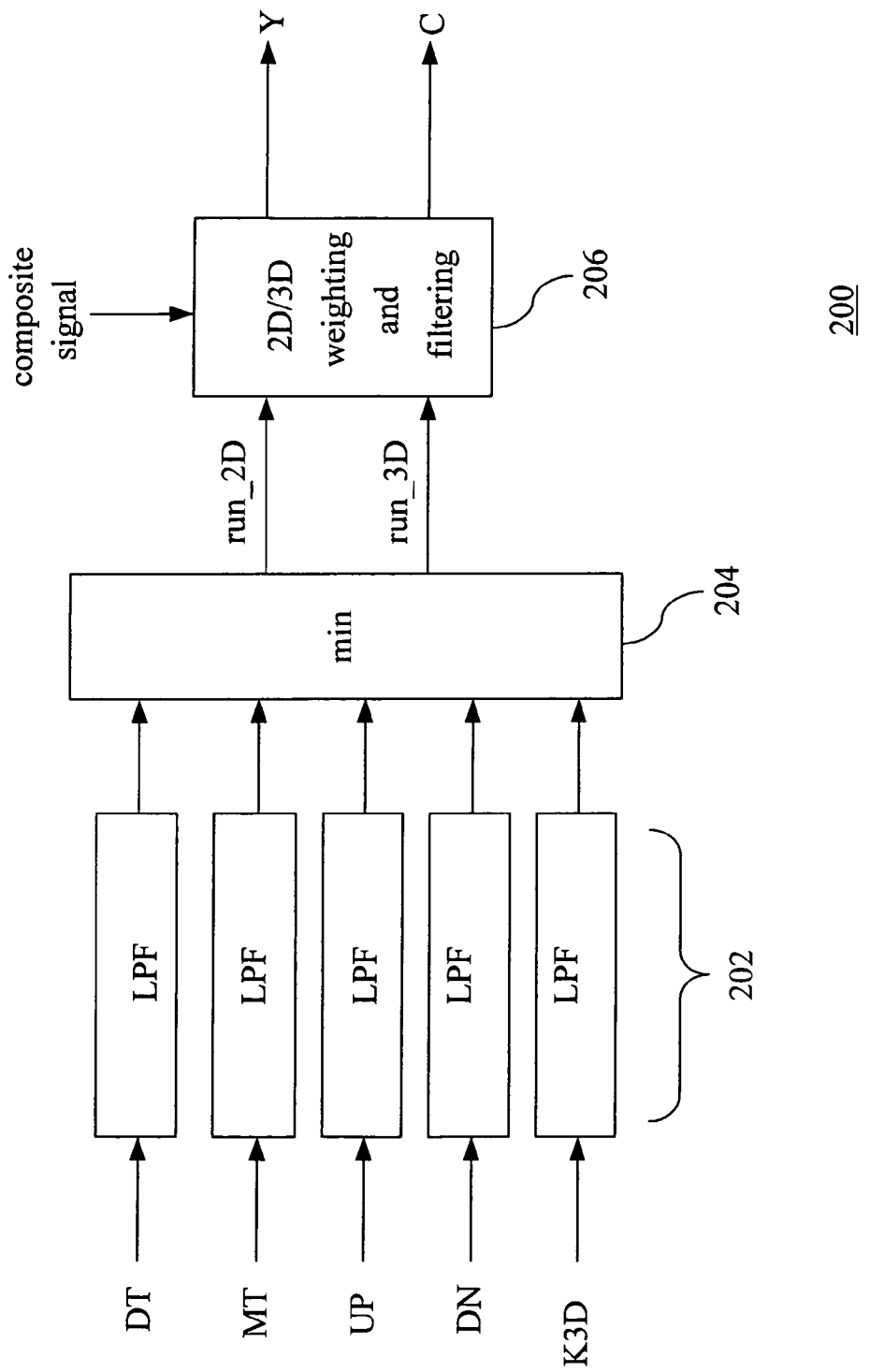
FIG. 2 illustrates a general block diagram of a two-dimensional (2D)/three-dimensional (3D) weighting comb filter according to one embodiment of the present invention.

FIG. 2 illustrates a general block diagram of a two-dimensional (2D)/three-dimensional (3D) weighting comb filter according to one embodiment of the present invention. The 2D/3D weighting comb filter 200 is provided to separate the composite TV analog signal into the luminance (Y) signal and the chrominance (C) signal. The 2D/3D weighting comb filter 200 includes a number of low-pass filters 202, a comparing unit 204, and a weighting and filtering unit 206. First, the differences MT and DT between the processing pixel and its horizontal neighbor pixels, the differences UP and DN between the processing pixel and its vertical neighbor pixels, and the difference K3D between the processing pixel and its temporal neighbor pixel are respectively measured. Then, the low-pass filters 202 perform the low-pass filtering operation for the differences MT, DT, UP, DN and K3D, respectively, such that noises of each of the differences MT, DT, UP, DN and K3D are eliminated.

Afterward, the comparing unit 204 compares the differences MT, DT, UP, DN and K3D with one another to obtain a minimum difference, in which the minimum difference is used as a factor of a weighting function. Thereafter, the weighting and filtering unit 206 employs an appropriate weighting function on the basis of the minimum difference to control the 2D and 3D comb filter for simultaneously filtering the composite TV analog signal. That is, the magnitudes of a part of the composite TV analog signal filtered by the 2D comb filter and the magnitudes of the other part of the composite TV analog signal filtered by the 3D comb filter both are determined by the weighting function, so as to properly separate the composite TV analog signal into the luminance signal and the chrominance signal.

The following describes the embodiments of filtering the composite TV analog signal according to the weighting function. In one embodiment, when the temporal neighbor pixels have the minimum difference therebetween, the composite TV analog signal is filtered mainly by the 3D comb filter. In other words, according to the weighting function, the 3D comb filter filters at least half of the composite TV analog signal, and the 2D comb filter filters the rest of the composite TV analog signal. Specifically, the magnitudes of the at least half of the composite TV analog signal filtered by the 3D comb filter and the magnitudes of the rest of the composite TV analog signal filtered by the 2D comb filter can be designed to be linearly correlated with each other based on the weighting function.

Figure 3:
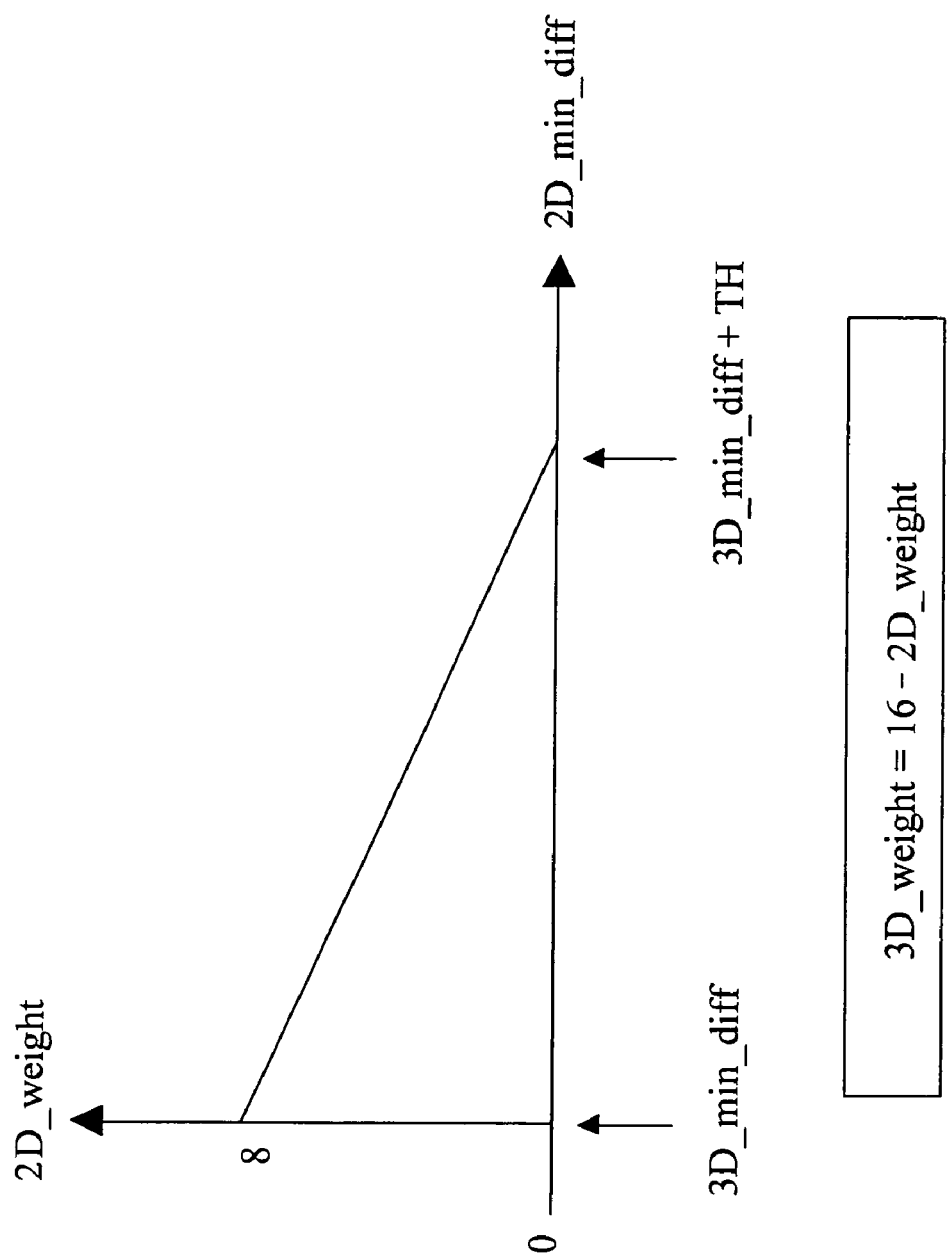
FIG. 3 illustrates a diagram of the employed weighting function when the temporal neighbor pixels have the minimum difference therebetween according to one embodiment of the present invention.

FIG. 3 illustrates a diagram of the employed weighting function when the temporal neighbor pixels have the minimum difference therebetween according to one embodiment of the present invention. As shown in FIG. 3, the magnitudes of the part of the composite TV analog signal filtered by the 3D comb filter are linearly correlated with the magnitudes of the part of the composite TV analog signal filtered by the 2D comb filter (e.g. 3D_weight=16−2D_weight) in accordance with the weighting function. When the temporal neighbor pixels have the minimum difference (i.e. 3D_min_diff) therebetween, the 3D comb filter is provided to filter at least half of the composite TV analog signal, and the 2D comb filter is provided to filter the rest of the composite TV analog signal. Specifically, according to the weighting function 3D_weight=16−2D_weight, the magnitudes of the part of the composite TV analog signal filtered by the 3D comb filter (i.e. 3D_weight) changes between 8 and 16, and the magnitudes of the rest of the composite TV analog signal filtered by the 2D comb filter (i.e. 2D_weight) changes between 8 and 0. It is noticed that the foregoing magnitudes (i.e. 0, 8 and 16) exemplarily represent the relative degrees of using the 2D and 3D comb filter to filter the composite TV analog signal and constitute no limitations.

Furthermore, a threshold (TH), which is adapted to the difference between the images, can be set for the weighting function to determine the range that the 2D comb filter is used. In other words, when the temporal neighbor pixels have the minimum difference (i.e. 3D_min_diff) therebetween and the composite TV analog signal is mainly filtered by the 3D comb filter, the range between the minimum difference and the minimum difference plus the threshold (i.e. from 3D_min_diff to 3D_min_diff+TH) is determined for the 2D comb filter capable of being used according to the weighting function. That is, when the difference between the horizontal neighbor pixels or the vertical neighbor pixels (i.e. 2D_min_diff) varies over the threshold (or over the range between 3D_min_diff and 3D_min_diff+TH), the 3D comb filter filters the entire composite TV analog signal.

In another embodiment, when the horizontal or vertical neighbor pixels have the minimum difference therebetween, the composite TV analog signal is filtered mainly by the 2D comb filter. In other words, according to the weighting function, the 2D comb filter filters at least half of the composite TV analog signal, and the 3D comb filter filters the rest of the composite TV analog signal. Specifically, the magnitudes of the at least half of the composite TV analog signal filtered by the 2D comb filter and the magnitudes of the rest of the composite TV analog signal filtered by the 3D comb filter also can be designed to be linearly correlated with each other based on the weighting function.

Figure 4:
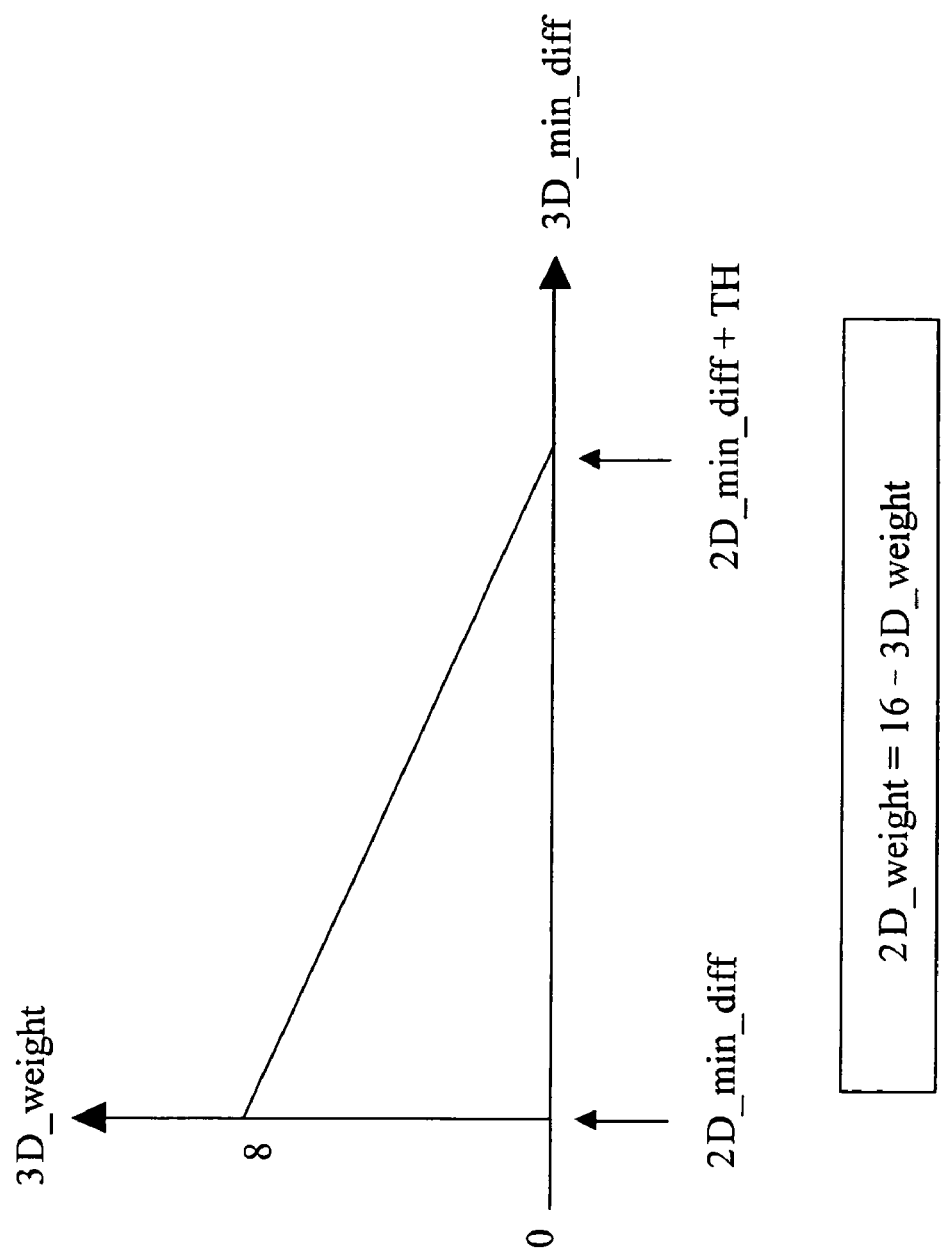
FIG. 4 illustrates a diagram of the employed weighting function when the horizontal or vertical neighbor pixels have the minimum difference therebetween according to one embodiment of the present invention.

FIG. 4 illustrates a diagram of the employed weighting function when the horizontal or vertical neighbor pixels have the minimum difference therebetween according to one embodiment of the present invention. As shown in FIG. 4, the magnitudes of the part of the composite TV analog signal filtered by the 2D comb filter are linearly correlated with the magnitudes of the part of the composite TV analog signal filtered by the 3D comb filter (e.g. 2D_weight=16−3D_weight) in accordance with the weighting function. When the horizontal or vertical neighbor pixels have the minimum difference therebetween, the 2D comb filter is provided to filter at least half of the composite TV analog signal, and the 3D comb filter is provided to filter the rest of the composite TV analog signal. Specifically, for the weighting function 2D_weight=16−3D_weight, the magnitudes of the part of the composite TV analog signal filtered by the 2D comb filter (i.e. 2D_weight) changes between 8 and 16, and the magnitudes of the part of the composite TV analog signal filtered by the 3D comb filter (i.e. 3D_weight) changes between 8 and 0.

Furthermore, another threshold (TH), which is also adapted to the difference between the images, can be set for the weighting function to determine the range that the 3D comb filter is used. In other words, when the horizontal or vertical neighbor pixels have the minimum difference (i.e. 2D_min_diff) therebetween and the composite TV analog signal is mainly filtered by the 2D comb filter, the range between the minimum difference and the minimum difference plus the threshold (i.e. from 2D_min_diff to 2D_min_diff+TH) is determined for the 3D comb filter capable of being used according to the weighting function. That is, when the difference between the temporal neighbor pixels (i.e. 3D_min_diff) varies over the threshold (or over the range between 2D_min_diff and 2D_min_diff+TH), the 2D comb filter filters the entire composite TV analog signal.

In yet another embodiment, when the temporal neighbor pixels and the horizontal or vertical neighbor pixels concurrently have the minimum difference therebetween, the composite TV analog signal is also filtered mainly by the 2D comb filter. Similarly, the 2D comb filter filters at least half of the composite TV analog signal, and the 3D comb filter filters the rest of the composite TV analog signal. The magnitudes of the at least half of the composite TV analog signal filtered by the 2D comb filter and the magnitudes of the rest of the composite TV analog signal filtered by the 3D comb filter is designed to be linearly correlated with each other based on the weighting function (e.g. 2D_weight=16−3D weight) as shown in FIG. 4. That is, the magnitudes of the part of the composite TV analog signal filtered by the 2D comb filter (i.e. 2D_weight) changes between 8 and 16, and the magnitudes of the rest of the composite TV analog signal filtered by the 3D comb filter (i.e. 3D_weight) changes between 8 and 0. Likewise, the range between 2D_min_diff and 2D_min_diff+TH is determined for the 3D comb filter capable of being used according to the weighting function. Further, when the difference between the temporal neighbor pixels (i.e. 3D_min_diff) varies over the threshold (or over the range between 2D_min_diff and 2D_min_diff+TH), the 2D comb filter filters the entire composite TV analog signal.

Figure 5:
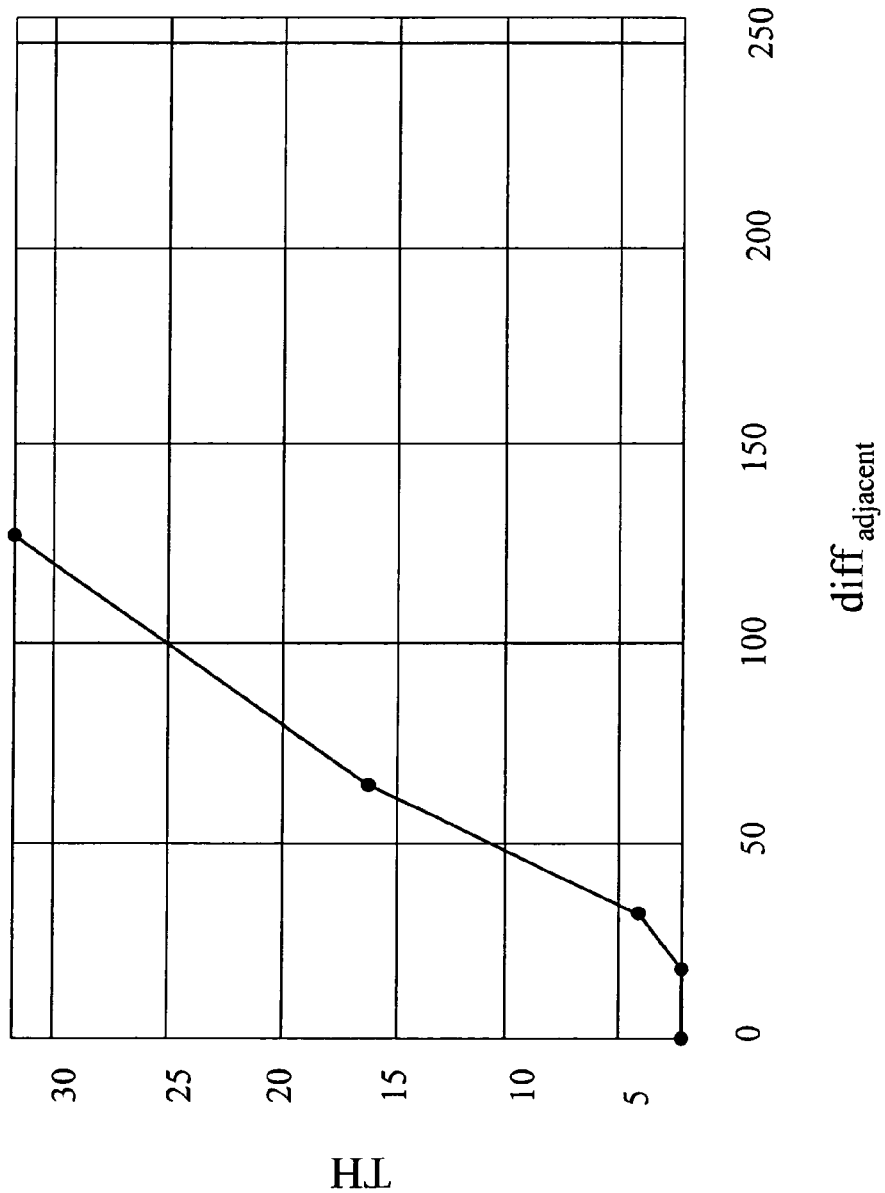
FIG. 5 illustrates a diagram of the adaptive threshold corresponding to the differences between the adjacent images according to one embodiment of the present invention.

FIG. 5 illustrates a diagram of the adaptive threshold corresponding to the differences between the adjacent images according to one embodiment of the present invention. As shown in FIG. 5, the threshold (TH) correspondingly increases when the difference between the adjacent images (i.e. diff$_{adjacent}$) increases. In other words, if the adjacent image signals vary significantly, the corresponding threshold has to be increased and adapted to the variation.

According to the embodiments of the present invention, the method for separating luminance and chrominance of the composite TV analog signal can be applied to filter the composite TV analog signal well by selectively controlling the 2D and 3D comb filter based on the weighting function. As a result, the composite TV analog signal can be well separated into the luminance (Y) signal and the chrominance (C) signal, so as to obtain the images having better quality.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A method for separating luminance and chrominance of a composite TV analog signal, the method comprising the steps of:
    measuring first gray level differences between horizontal neighbor pixels, second gray level differences between vertical neighbor pixels and third gray level differences between temporal neighbor pixels encoded in the composite TV analog signal;
    comparing the first, second and third gray level differences with one another to obtain a minimum difference used as a factor of a weighting function; and
    filtering the composite TV analog signal simultaneously by a two-dimensional (2D) comb filter and a three-dimensional (3D) comb filter according to the weighting function on the basis of the minimum difference to obtain a luminance signal and a chrominance signal;
    wherein magnitudes of a part of the composite TV analog signal filtered by the 2D comb filter and magnitudes of the other part of the composite TV analog signal filtered by the 3D comb filter are determined by the weighting function.

2. The method as claimed in claim 1, wherein the step of filtering the composite TV analog signal simultaneously by the 2D and 3D comb filter further comprises the step of:
    filtering the composite TV analog signal mainly by the 3D comb filter when the temporal neighbor pixels having the minimum difference therebetween.

3. The method as claimed in claim 2, wherein the step of filtering the composite TV analog signal mainly by the 3D comb filter further comprises the steps of:
    filtering at least half of the composite TV analog signal by the 3D comb filter; and
    filtering the rest of the composite TV analog signal by the 2D comb filter.

4. The method as claimed in claim 3, wherein magnitudes of the at least half of the composite TV analog signal filtered by the 3D comb filter and magnitudes of the rest of the composite TV analog signal filtered by the 2D comb filter are linearly correlated with each other based on the weighting function.

5. The method as claimed in claim 2, wherein the step of filtering the composite TV analog signal mainly by the 3D comb filter further comprises the steps of:
    setting a threshold for the weighting function; and
    filtering the composite TV analog signal all by the 3D comb filter when the first or second gray level differences being over the threshold.

6. The method as claimed in claim 1, wherein the step of filtering the composite TV analog signal simultaneously by the 2D and 3D comb filter further comprises the step of:
    filtering the composite TV analog signal mainly by the 2D comb filter when the horizontal neighbor pixels or the vertical neighbor pixels having the minimum difference therebetween.

7. The method as claimed in claim 6, wherein the step of filtering the composite TV analog signal mainly by the 2D comb filter further comprises the steps of:
    filtering at least half of the composite TV analog signal by the 2D comb filter; and
    filtering the rest of the composite TV analog signal by the 3D comb filter.

8. The method as claimed in claim 7, wherein magnitudes of the at least half of the composite TV analog signal filtered by the 2D comb filter and magnitudes of the rest of the composite TV analog signal filtered by the 3D comb filter are linearly correlated with each other based on the weighting function.

9. The method as claimed in claim 6, wherein the step of filtering the composite TV analog signal mainly by the 2D comb filter further comprises the steps of:
    setting a threshold for the weighting function; and
    filtering the composite TV analog signal all by the 2D comb filter when the third gray level differences being over the threshold.

10. The method as claimed in claim 1, wherein the step of filtering the composite TV analog signal simultaneously by the 2D and 3D comb filter further comprises the steps of:
    filtering the composite TV analog signal mainly by the 2D comb filter when the temporal neighbor pixels and the horizontal or vertical neighbor pixels concurrently having the minimum difference therebetween.

11. The method as claimed in claim 10, wherein the step of filtering the composite TV analog signal mainly by the 2D comb filter further comprises the steps of:
    filtering at least half of the composite TV analog signal by the 2D comb filter; and
    filtering the rest of the composite TV analog signal by the 3D comb filter.

12. The method as claimed in claim 11, wherein magnitudes of the at least half of the composite TV analog signal filtered by the 2D comb filter and magnitudes of the rest of the composite TV analog signal filtered by the 3D comb filter are linearly correlated with each other based on the weighting function.

13. The method as claimed in claim 10, wherein the step of filtering the composite TV analog signal mainly by the 2D comb filter further comprises the steps of:
    setting a threshold for the weighting function; and
    filtering the composite TV analog signal all by the 2D comb filter when the third gray level differences being over the threshold.

14. The method as claimed in claim 1, further comprising the step of:
    low-pass filtering the first, second and third gray level differences before the comparing step.

* * * * *